United States Patent
Granlund et al.

(10) Patent No.: US 6,257,359 B1
(45) Date of Patent: Jul. 10, 2001

(54) AIR HANDLING SYSTEM FOR ENGINES

(75) Inventors: Royce Granlund, Milnor; Thomas M. Sagaser, Bismark; Van Satlak; Harold K. Beckstrom, both of Lisbon, all of ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/340,839

(22) Filed: Jun. 28, 1999

(51) Int. Cl.$^7$ .................................................. B60K 11/00
(52) U.S. Cl. ......................... 180/68.1; 165/51; 180/68.4
(58) Field of Search ................................ 180/68.1, 68.4, 180/68.2, 89.1, 89.12; 280/756; 123/41.31, 41.7; 415/206, 204; 60/321; 165/51

(56) References Cited

U.S. PATENT DOCUMENTS

| | | | |
|---|---|---|---|
| 524,943 | * 8/1894 | Horne | 415/206 |
| 1,563,478 | 12/1925 | Fox . | |
| 2,585,083 | 2/1952 | Bouvy . | |
| 3,618,691 | 11/1971 | Honda | 180/54 |
| 4,226,217 | 10/1980 | Haslbeck et al. | 123/41.62 |
| 4,296,871 | 10/1981 | Monte | 169/62 |
| 4,382,481 | * 5/1983 | Moore | 180/54 A |
| 4,696,361 | 9/1987 | Clark et al. | 180/68.4 |
| 4,815,550 | 3/1989 | Mather et al. | 180/68.1 |
| 4,934,449 | * 6/1990 | Watt et al. | 165/41 |
| 5,269,265 | * 12/1993 | Pretzsch et al. | 123/41.56 |
| 5,613,564 | 3/1997 | Rhines | 169/61 |
| 5,848,652 | 12/1998 | Bennett | 169/62 |

* cited by examiner

Primary Examiner—Brian L. Johnson
Assistant Examiner—Tony Winner
(74) Attorney, Agent, or Firm—Westman, Champlin & Kelly, P.A.

(57) ABSTRACT

A skid steer loader has an engine compartment that is enclosed with walls, and an engine mounted in the engine compartment. The engine has components such as an exhaust manifold and a muffler inside the engine compartment which can get quite hot under certain operating conditions. A radial fan is provided for withdrawing air from the engine compartment and discharging it to ambient conditions to reduce the temperature in the engine compartment. The fan is in a housing that has apertures that directs air under pressure against the exhaust manifold and muffler and other hot components of the engine to reduce the maximum temperature such components reach.

11 Claims, 6 Drawing Sheets

AIR HANDLING SYSTEM FOR ENGINES

BACKGROUND OF THE INVENTION

The present invention relates to an air handling system for engines, in particular diesel engines, which provide openings in an engine compartment fan housing to direct cooling air onto surfaces of the engine to reduce temperatures from such surfaces.

An engine compartment air handling system for a skid steer loader is typically shown in U.S. Pat. No. 4,815,550. Typically, a fan housing is mounted in the engine compartment and has an inlet which will draw air from the engine compartment, and a second inlet which will withdraw air from a heat exchanger compartment. A radial fan is used to withdraw heated air from the connected compartment and then discharge it to atmosphere. A desired fan shroud has the radial fan in the center portions and is a closed housing except for the inlets and outlets. By withdrawing the warm air from the compartment, cool replacement air comes into the engine compartment.

SUMMARY OF THE INVENTION

The present invention relates to providing a pressurized flow of air onto hot surfaces of an engine to maintain such surfaces at a lowered temperature than they normally would attain without direct application of forced air. Providing openings in the fan housing in a proper location so that the pressurized air in the housing generated by the radial fan that is used will blow air onto the correct surfaces. As part of this, the inlet openings in the engine compartment fan inlet plate are enlarged a desired amount so that there will be adequate airflow through the engine compartment, because the air that is being added from the holes in the fan housing has to be removed as well. This forms a type of partial recirculation.

In the prior art, there were automobiles and other vehicles which used a fan which drew air through a radiator, which was then warm air, and discharged it into the engine compartment and through openings in the bottom of the engine compartment or other locations. The present device, which is a skid steer loader, is an off-road vehicle that operates at a lower speed. It is desirable to withdraw heated air from the engine compartment, while cool air is drawn into the compartment from appropriate openings.

Usually the incoming air is air from the operator's compartment, so the flow of air first acts to keep the operator cool. It is in this context that the present invention finds an advantage in that the fan can be used for directing air under pressure onto selected parts of the engine without discharging all of the air from the fan into the engine compartment. The present arrangement of withdrawing heated air from the engine compartment can be continued.

The invention relates specifically to skid steer loaders, in its preferred form, but it is applicable to other types of equipment where engines that have hot areas onto which oil may drop are used, and where an evacuating airflow is discharged from the engine compartment with a forced air fan. The housing for the fan is provided with outlet openings that will cause air under pressure to be blown across components of the engine, while limiting the amount of air that is blown into the engine compartment so an adequate airflow is maintained. The limitation in the amount of air passing into the engine compartment will ensure that the engine compartment itself does not become overly warm because an adequate flow of air will be exhausted out. Replacement fresh air will come in through provided openings in the engine compartment.

DETAILED DESCRIPTION OF THE PREFERRED EMBODIMENTS

Figure 1:
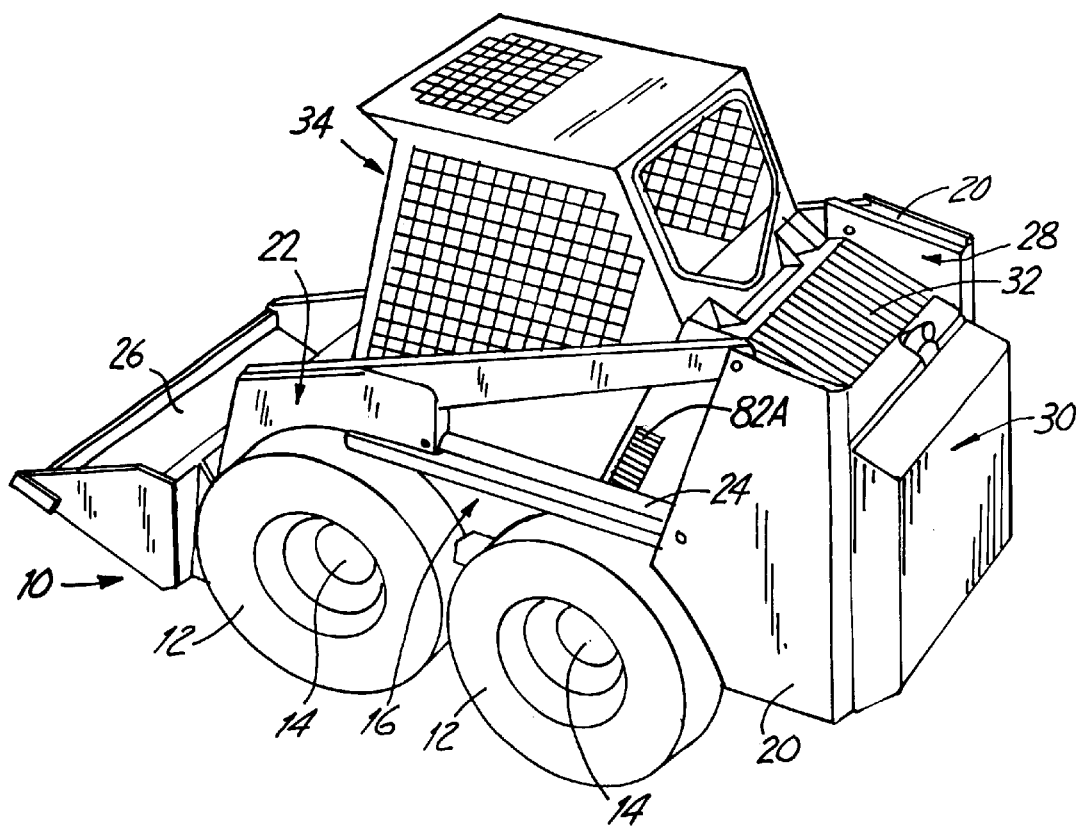
FIG. 1 is a perspective view of a typical skid steer loader utilizing the arrangement of the present invention.

A skid steer loader 10 which incorporates the present invention and forms the preferred vehicle on which the invention is used, is shown generally in FIG. 1 for reference. The loader 10 includes a main frame assembly 16, that is supported on an axle assembly 14 driving tires 12. The frame includes a pair of upright masts 20 at the rear, that mount a lift arm assembly 22, pivotally mounted to the uprights in a conventional manner and operated with linear hydraulic actuators 24. Bucket 26 can be used at the ends of the lift arms for operation.

The uprights 20 are positioned on opposite sides of an engine compartment that is indicated generally at 28, and includes an openable end gate 30 for access to the engine compartment. A heat exchanger compartment is above the engine compartment as illustrated generally at 24, the heat exchanger compartment has an inlet grill 32 at the upper side thereof.

Figure 2:
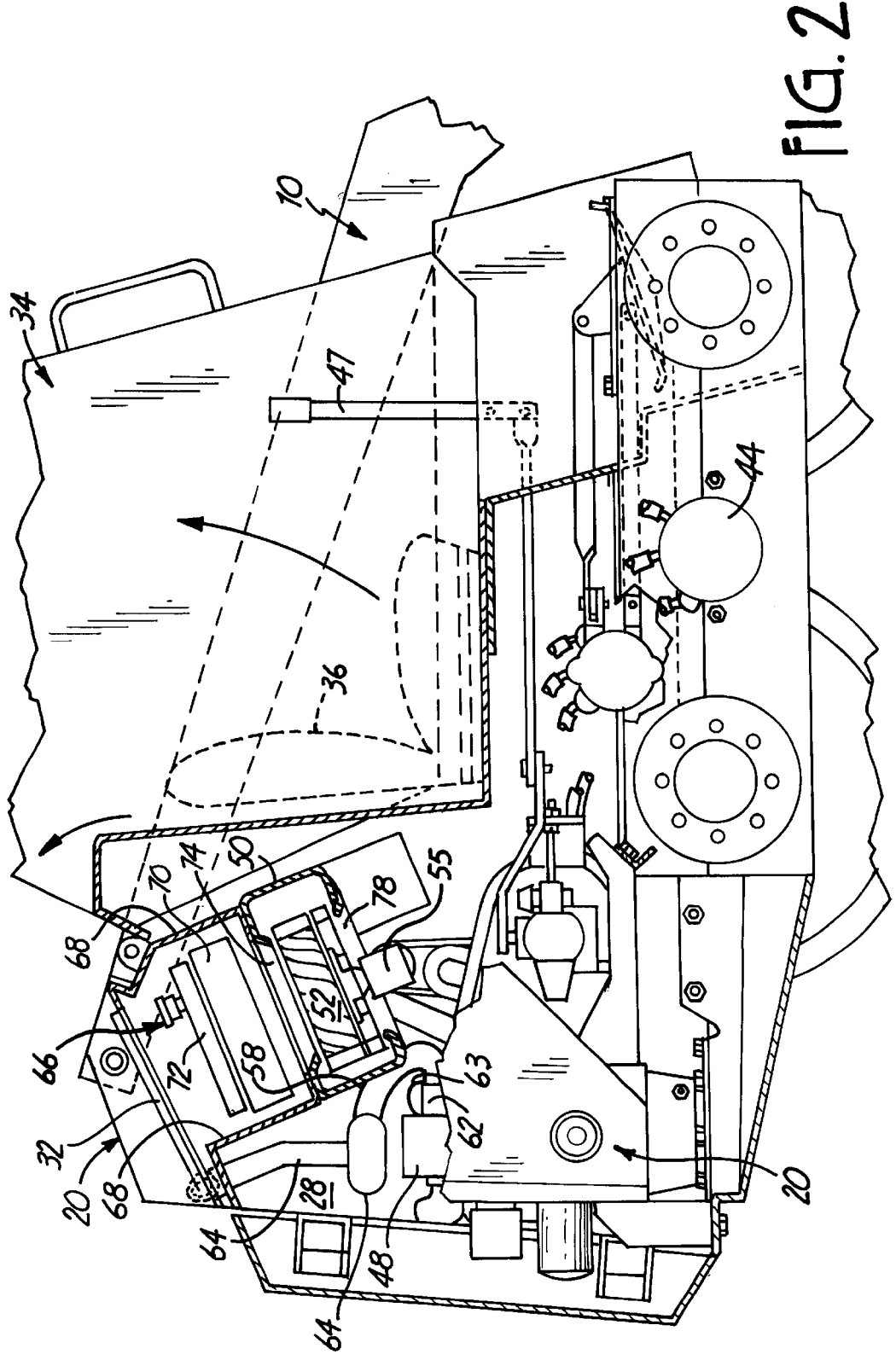
FIG. 2 is a fragmentary schematic sectional view of the loader of FIG. 1 taken from the side opposite that shown in FIG. 1.
Figure 3:
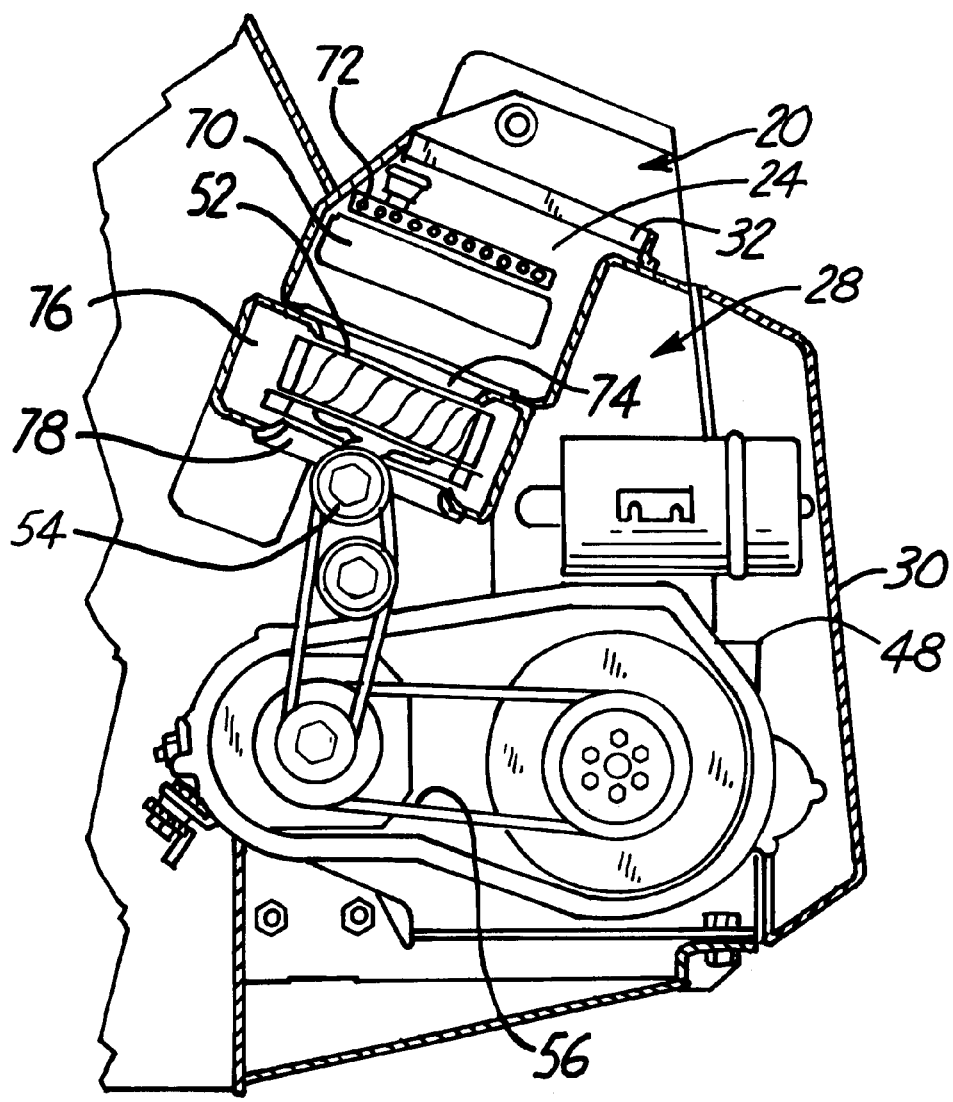
FIG. 3 is a side view of the rear portion of the loader of FIG. 1 with portions cut away to illustrate the engine and heat exchanger compartments of the vehicle.

Referring generally to FIGS. 2 and 3, the engine compartment 28 is illustrated in greater detail, as is the door or gate 30 for the access to the engine compartment.

It can be seen that the main frame 16 provides a support for the operators compartment 34, including an operator's seat illustrated in dotted lines at 36. A wall 38 separates the engine compartment 28 from the operator's compartment 34, and as is desired, the airflow from the fan for cooling the radiator and other components will direct outgoing air in direction so that it does not enter the operator's compartment.

The engine, as illustrated, a turbo charged diesel engine, is shown at 48 and is mounted in a suitable manner in the engine compartment 28. The crank shaft of the engine extends crossways to the loader. The crank shaft drives a suitable hydraulic pump for operating the components of the vehicle and propelling the vehicle with hydraulic motors such as that shown at 44, in a well-known manner to propel the vehicle. Controls are provided in the operator's compartment.

In the present invention, a fan shroud or housing 50 is mounted in the engine compartment 28, and mounts a radial fan 52 that is driven in a suitable manner, from the engine. As shown in FIG. 3, the drive comprises a belt 54 operating on suitable pulleys through a gear box 55, to rotate the radial fan 52 about its axis inside the fan housing assembly 50. This is driven from the crank shaft of the engine 48 through another belt and pulley arrangement shown schematically at 56.

Figure 5:
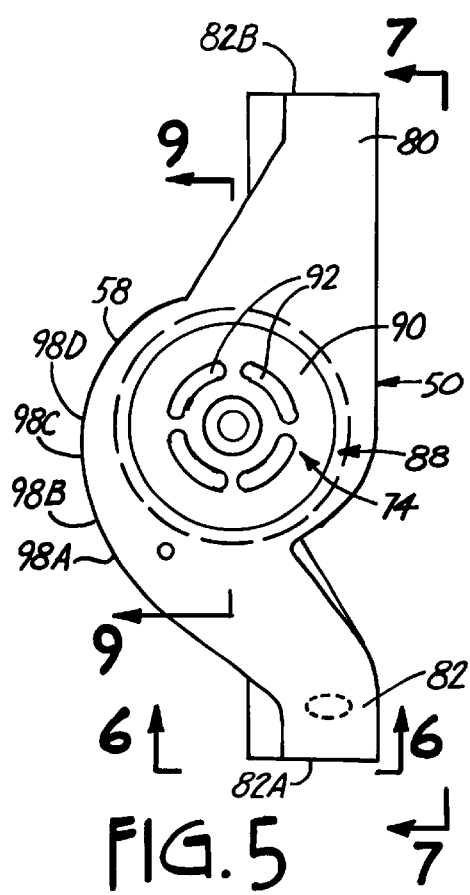
FIG. 5 is a top plan view of the fan housing or shroud of the present invention.

The fan housing 50 is positioned adjacent to the engine 48, and in particular, has a side wall 58 that is part of the scroll-shaped housing (see FIG. 5) that is adjacent to components of the engine, such as the exhaust manifold 62, the muffler 64, and other components such as an exhaust gas driven turbo charger 63 can get quite hot during operation. The exhaust pipe 65 leads from the turbo charger to the muffler.

The fan housing 50 is mounted against a heat exchanger compartment shown in FIG. 2 at 66, and the heat exchanger compartment is formed by an enclosed wall 68 that houses a radiator 70 and an oil cooler 72 of the skid steer loader. The radiator 70 cools coolant for the engine 48, and the oil cooler 72 provides cooling of hydraulic oil that is used for operation of a skid steer loader. Hoses connect these components to the engine and the hydraulic reservoir, respectively.

In order to provide cooling, it is desired that a flow of cool air pass over the oil cooler 72 and radiator 70 through the inlet opening 32. The housing 68 is enclosed, except for the inlet opening, and an opening in the lower side, as shown in FIG. 2, which aligns with an inlet opening 74 to the fan housing 50. This is directly above the fan 52, and provides a flow of cooling air into the fan housing 50 and specifically the interior chamber 76 for the fan.

Figure 4:
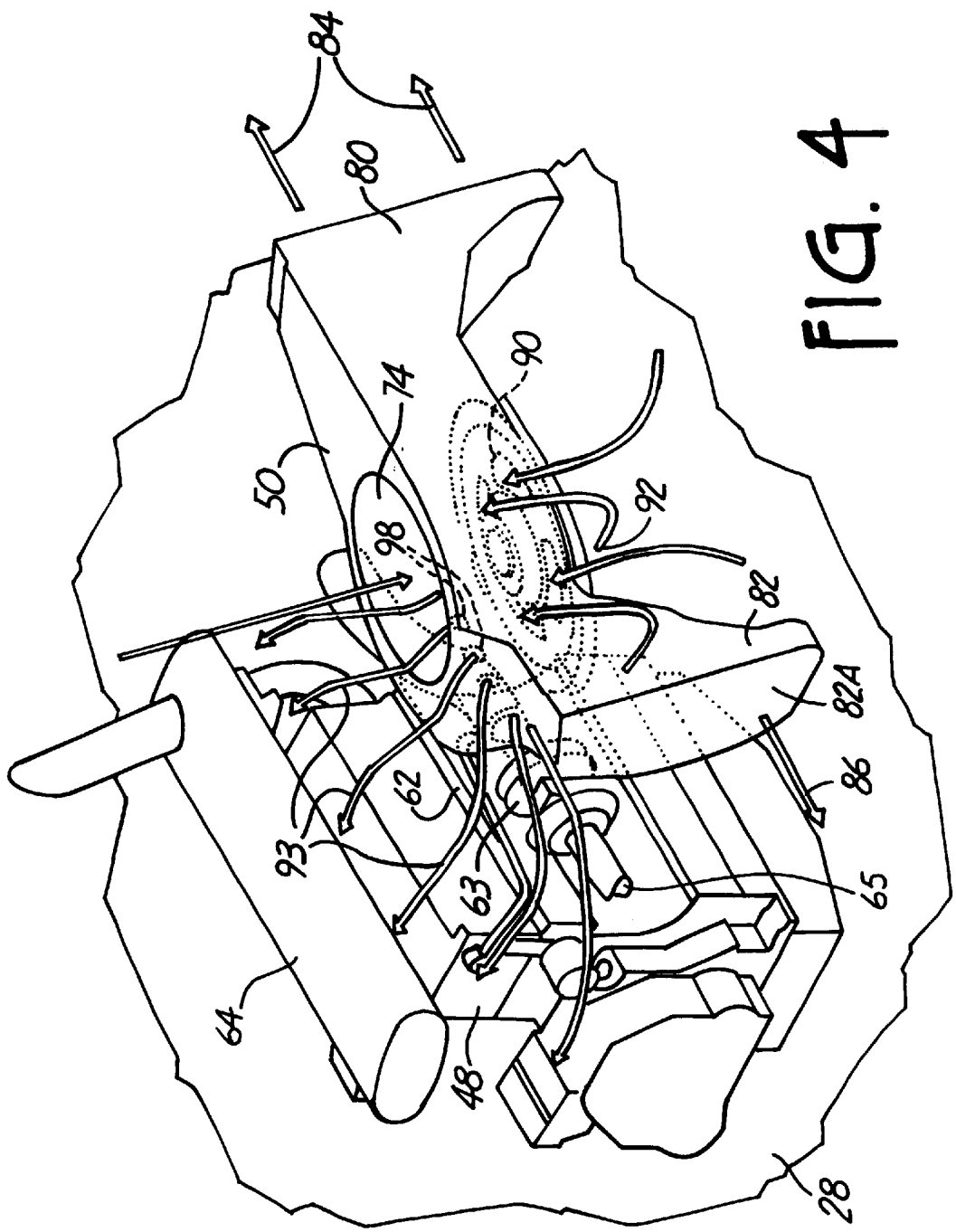
FIG. 4 is a schematic perspective view of the engine and heat exchanger housing or shroud.

The fan housing 50 also includes an inlet opening indicated generally at 78 at the lower side, that has an inlet plate 90 with apertures 92 that open directly into the engine compartment 28. When the fan 52 is driven, air is taken in from both the top and bottom of the fan housing 50 and discharged out laterally through lateral duct assemblies 80 and 82, respectively, that extend to opposite sides of the loader. The discharge opening 82A is shown in FIG. 1 on the side of the skid steer loader. A similar opening 82B is present on the opposite side of the skid steer loader for providing an outflow of air through these ducts, as indicated by the arrows 84 and 86 in FIG. 4.

The radial fan 52 is mounted for rotation within a central portion 88 of the fan shroud or housing 50, adjacent to and between the air intake openings 74 and 78. The radial fan 52 preferably is a double-bladed fan that will provide adequate airflow into the fan housing from both the engine compartment and the heat exchanger compartment.

The fan inlet plate 90 leading from the engine compartment has the suitably sized apertures 92 to provide for controlling or regulating the amount of air removed from the engine compartment. These apertures 92, as will be explained, are larger than in a conventional arrangement such as that shown in U.S. Pat. No. 4,815,550.

The ducts 80 and 82 depend from the central portion 88, and have relatively large openings for permitting the discharge or air without substantial restriction once it has been taken into the fan housing by the radial fan 52.

Figure 9:
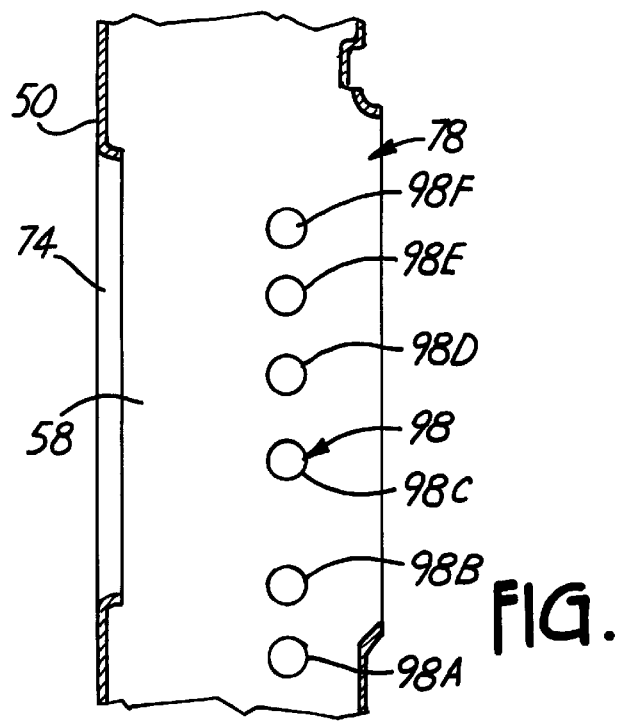
FIG. 9 is a sectional view taken as on Line 9—9 in FIG. 5.

In the present invention, the central housing portion 82 has the scroll-shaped wall 58 that faces the engine 28, and the hot components such as the exhaust manifold 62, turbo charger 63, exhaust pipe 65, muffler 64, and other hot engine components. Wall 58 has a plurality of outward airflow apertures 98 formed therein, at a level, and at locations on the wall such that air flowing out of these apertures will be directed toward the hot components of the engine 48 to cool the extremely hot components the flow is indicated at 93 in FIG. 4. As can be seen in FIG. 9, the spacing between the apertures shown generally at 98, such as the individual apertures 98A, 98B, 98C, 98D, 98E and 98F can be varied so that the airflow volume is controlled but yet the airflow is directed at the areas and components which become the hottest on the engine 48.

The inlet apertures 92 are enlarged to ensure that there is an adequate airflow out of the engine compartment 28 through the fan housing 50 and specifically the central portion 88, and then out the duct ends 80 and 82 for discharge to the atmosphere while taking into account the recirculation or addition of air into the engine compartment through the apertures 98 in the wall 94.

The balancing of the flow can thus be achieved, and the size of fan 52 does not have to be radically altered.

Figure 6:
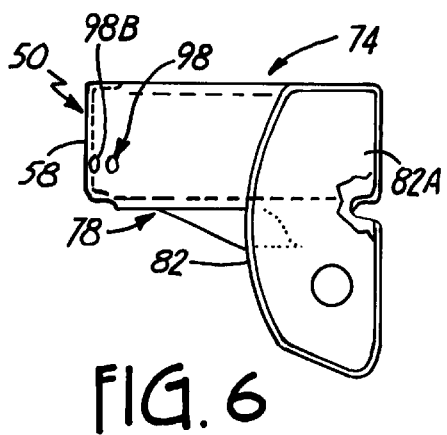
FIG. 6 is an end view thereof taken along Line 6—6 in FIG. 5.
Figure 7:
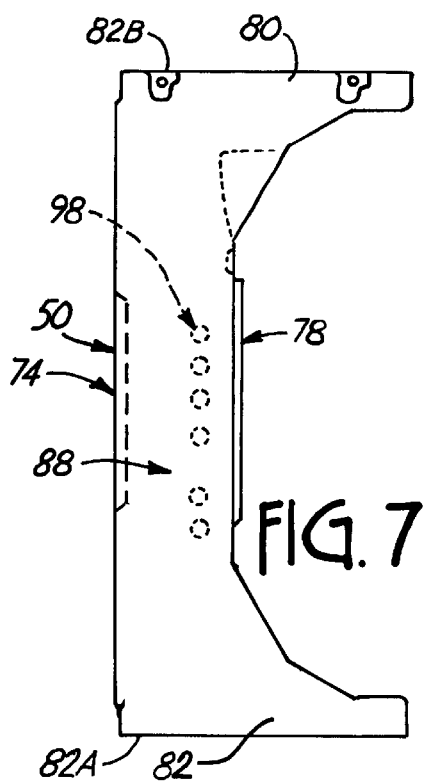
FIG. 7 is a side view of the fan housing of FIG. 5 taken on Line 7—7 in FIG. 5.
Figure 8:
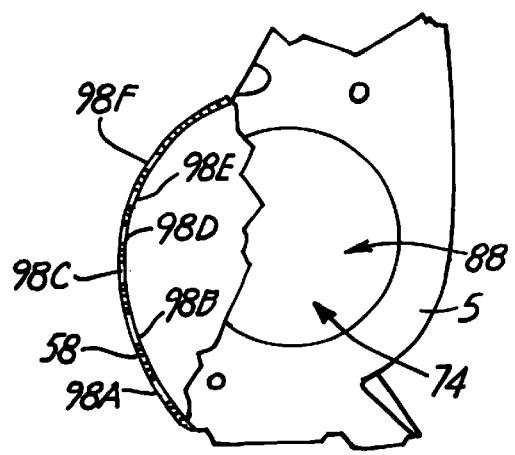
FIG. 8 is a fragmentary enlarged view of the center portions of the fan housing illustrating the outlet ports or openings formed according to the present invention.

FIG. 6 shows an end view of one of the ducts and it can be seen that the ducts are shaped so that they are about the same size as the axial or vertical height of the center portion 88, near the fan and they enlarge in vertical direction so that the opening 82A, for example, is of substantial size. Suitable connecting fittings can be made for mounting the fan in place, which are explained more fully in U.S. Pat. No. 4,815,550.

Again, the engine compartment is closed except for the inlet openings that are provided for fresh airflow, such as through the wall 38 leading to the operator's compartment to provide airflow out of the operator's compartment, or through suitable apertures in the bottom of the engine compartment. The fan 52 is of size so that it will provide airflow through both the engine compartment and the heat exchanger compartments 66. Heat exchanger compartment wall 68, as shown, forms an enclosure except for the inlet 32 so that the cool air will flow across the radiator 70 and the oil cooler 72 into the housing compartment 76 in the central portion 88 of the fan shroud.

The amount of air that is discharged onto the hot components or surfaces of the engine will be sufficient to keep the temperature down on the hot components to a level that will help increase engine life. Evaporation of hydraulic oil contacting the components cooled by the supplemental air flow will be probably in the form of a smoke, which will be discharged out through the sides of the engine compartment through the ducts 80 and 82.

The invention has particular applicability for turbo charged engines, since the turbo charger gets quite hot from the exhaust gases running it.

Although the present invention has been described with reference to preferred embodiments, workers skilled in the art will recognize that changes may be made in form and detail without departing from the spirit and scope of the invention.

What is claimed is:

1. In a vehicle having an engine compartment, a fan for discharging air from the engine compartment through ducts that direct the air to particular discharge locations, and an engine in the engine compartment having components that are heated by combustion to become hot and which are exposed to the engine compartment during operation, the improvement comprising a fan housing for the fan having an inlet to cause airflow into the fan housing from the engine compartment, and at least one aperture in the fan housing adjacent to and facing a hot component of the engine for providing a direct airflow from the fan housing toward such hot component.

2. The apparatus of claim 1, wherein the hot components comprise at least one of an exhaust manifold and a muffler connected to the engine.

3. In a vehicle having an engine compartment, a fan for discharging air from the engine compartment through ducts that direct the air to particular discharge locations, and an engine in the engine compartment having components that are heated by combustion to become hot and which are exposed to the engine compartment during operation, the improvement comprising a housing for the fan having an inlet to cause airflow into the housing from the engine compartment, and an outlet, and at least one aperture in the housing adjacent to a hot component of the engine for providing an airflow over such hot component, wherein said housing for said fan comprises a central portion, the fan being mounted in said central portion and pressurizing the housing, the central portion having a wall adjacent to the fan, and the at least one aperture being in the wall adjacent to the fan and positioned to discharge air from the pressurized housing directly onto a hot component.

4. The apparatus of claim 1, wherein said fan housing comprises a housing for a radial fan, said fan comprising a radial fan rotated about an axis, said radial fan housing having a central portion, with an inlet in the central portion opening to the engine compartment, and a side wall of the fan housing having the apertures discharging onto the hot components of the engine.

5. The apparatus of claim 4, wherein said fan housing has a second inlet, said second inlet opening to a heat exchanger housing formed of closed side walls for housing coolers for components of the engine, said heat exchanger housing having a fresh air inlet opposite from the inlet to the fan housing.

6. The apparatus of claim 5, wherein said engine compartment is an enclosed compartment having side walls and end walls, with an inlet to the engine compartment being a controlled access inlet.

7. A skid steer loader including a mobile frame, an operator's compartment positioned on the frame, an engine compartment to the rear of the operator's compartment having a controlled access airflow inlet into the compartment, an engine mounted in the engine compartment and having an exhaust manifold and a muffler in the engine compartment, a fan housing on the frame having an air intake aperture opening into the engine compartment, and at least one air discharge duct, a fan mounted within the fan housing to draw air into the fan housing through the air intake aperture, said fan housing having a side wall positioned adjacent to the engine, said side wall having ports therein for directing air pressurized by the fan through the ports and directing air under pressure from the fan housing toward the exhaust manifold and muffler of the engine of the skid steer loader.

8. The skid steer loader of claim 7 wherein said engine has a crank shaft mounted transversely to the direction of movement of the loader.

9. The skid steer loader of claim 7 wherein said air discharge duct has an opening passing through a wall of the engine compartment to ambient conditions.

10. The skid steer loader of claim 7 wherein said loader has a heat exchanger compartment formed of walls that enclose heat exchange components for the loader, a second air inlet opening into said heat exchanger compartment, and said fan housing having a second fan inlet to withdraw air from the heat exchanger compartment and discharge air through the air discharge duct.

11. The skid steer loader of claim 7, wherein the engine is turbo charged and has a turbo charger driven by exhaust gases, and the ports direct airflow toward the turbo charger.

* * * * *